United States Patent [19]

Novozhilov et al.

[11] 4,009,250
[45] Feb. 22, 1977

[54] CONTACT METHOD OF PRODUCING SULPHURIC ACID

[76] Inventors: Vasily Nikolaevich Novozhilov, ulitsa Novatorov, 22, kv. 30, Moscow, U.S.S.R.; Boris Vladimirovich Nekrasov, Ferganskaya ulitsa, 24, kv. 83, Moscow, U.S.S.R.; Pavel Alexeevich Semenov, deceased, late of Moscow, U.S.S.R.; Vera Vasilievna Semenova, administratrix, Yartsevskaya ulitsa, 27, korpus 6, kv. 61, Moscow, U.S.S.R.; Irina Pavlovna Semenova, administratrix, Banny pereulok, 7, korpus 2, kv. 38, Moscow, U.S.S.R.; Sergei Pavlovich Semenov, administrator, ulitsa Gertsena, 5/7, kv. 2, Moscow, U.S.S.R.

[22] Filed: May 21, 1975

[21] Appl. No.: 579,590

Related U.S. Application Data

[63] Continuation of Ser. No. 452,467, March 18, 1974, abandoned.

[52] U.S. Cl. .................................. 423/522; 55/73; 423/533
[51] Int. Cl.² ................ C01B 17/72; C01B 17/68; B01D 53/00
[58] Field of Search ................ 423/522, 532, 539; 55/73

[56] References Cited

UNITED STATES PATENTS

| | | | |
|---|---|---|---|
| 2,819,947 | 1/1958 | Stahl | 423/522 |
| 3,374,061 | 3/1968 | Topsoe | 423/522 |
| 3,432,264 | 3/1969 | Bostwick et al. | 423/522 |
| 3,593,497 | 7/1971 | Grimm et al. | 423/522 X |
| 3,788,043 | 1/1974 | Dorr et al. | 423/522 X |

*Primary Examiner*—Oscar R. Vertiz
*Assistant Examiner*—Gary P. Straub
*Attorney, Agent, or Firm*—Holman & Stern

[57] ABSTRACT

The proposed contact method of producing sulphuric acid consists in that sulphur or pyrite is roasted, with the resulting gaseous mixture having a maximum moisture content of 0.02 percent by volume being treated in order to oxidize the sulphurous acid anhydride contained therein into sulphuric anhydride. Then, the sulphuric anhydride is absorbed from the gaseous mixture by a 92–98 percent sulphuric acid solution, which is taken in a quantity of 0.4 to 1.5 kg per kg of the gaseous mixture. The absorption process is carried out at a temperature from 30° to 125° C. The flow velocity of the gaseous mixture is 13 to 16 m/sec.

2 Claims, No Drawings

CONTACT METHOD OF PRODUCING SULPHURIC ACID

This is a continuation of application Ser. No. 452,467, filed Mar. 18, 1974, now abandoned.

This invention relates to a contact method of producing sulphuric acid which is one of the most important products of chemistry.

The proposed method is intended preferably for plants of high capacity.

Known in the prior art is a contact method of producing sulphuric acid, is known in the prior art sulphur or pyrite which comprises roasting and the sulphurous acid anhydride contained in the resulting gaseous mixture is oxidized to sulphuric anhydride and then the sulphuric anhydride is absorbed from the gaseous mixture by sulphuric acid having a concentration of 95 percent at a temperature from 60°–120° C. The initial concentration of the sulphuric anhydride in the gas is about 7 percent by volume, and the moisture content maximum is 0.02 percent by volume. (A. G. Amelin "Sulphuric Acid Production Engineering", Moscow, Khimia Publishers, 1971, pp. 245, 254).

The considerable equilibrium pressure magnitude of water vapours over sulphuric acid having a concentration of 95 percent in terms of $H_2SO_4$ is responsible for the heavy fog of sulphuric acid that is formed in this process. The fog content in the exit gases, depending on the temperature, and other conditions of the process, varies from 0.7 to 44 g/n.cu.m., which drastically decreases the absorption of sulphuric anhydride in the acid. Recovery of this sulphuric acid fog from the exit gases is a complicated process requiring cumbersome and complicated apparatus, such as electric filters.

In industrial process of producing sulphuric acid, sulphuric anhydride is absorbed by sulphuric acid the concentration of which falls within a very narrow range, namely 98.5±0.3 percent in terms of $H_2SO_4$, and within which the equilibrium pressure of the water vapours over the sulphuric acid has the minimum magnitude, which is practically zero.

Due to this very narrow range of sulphuric acid concentration, the quantity of the acid required in order to absorb sulphuric anhydride is as large as 5 kg of the gaseous mixture. (Practically, these figures are even higher, viz., from 8–12 kg per kg of the gaseous mixture).

The velocity of the gaseous mixture flow would not usually exceed 2 normal meters per second.

This decreases the fog content of the exhausts to the minimum value of from 0.1–0.4 g/cu.m., and ensures the absorption of 99.9 percent of the anhydride in the acid.

The disadvantage of this method is the low intensity of the processes.

The object of the present invention is to decrease the sulphuric acid fog content in the exit gases.

Another object of the invention is to intensify the processes involved in the production of sulphuric acid by the contact method.

These and other objects of the invention are accomplished by the fact that in the contact method of producing sulphuric acid by roasting sulphur or pyrite with the subsequent production of a gaseous mixture, containing as a maximum 0.02 percent by volume of moisture, by oxidizing the sulphurous acid anhydride contained in said gaseous mixture into sulphuric anhydride, and by absorbing sulphuric anhydride from the gaseous mixture with 92–98 percent sulphuric acid at a temperature of from 30°–125° C, wherein, according to the invention, the acid for the absorption of sulphuric anhydride is taken in a quantity of 0.4 to 1.5 kg per kg of the gaseous mixture, the with flow velocity of the said gaseous mixture being 13 to 16 normal meters per second.

It is recommended that the proposed method be preferably realized with the sulphuric anhydride concentration in the gaseous mixture being not less than 0.25 percent by volume.

Although the concentration of the sulphuric acid delivered to absorb sulphuric anhydride falls down to 92 percent, it does not involve the formation of large quantities of fog. The content of the sulphuric acid fog in the exit gas does not exceed 0.15 g/cu.m.

The proposed method ensures the highly efficient absorption of sulphuric anhydride from the gaseous mixture, (viz., to 99.9 percent) which meets the technological requirements of industry producing sulphuric acid.

The proposed method of producing sulphuric acid can be realized in a flowsheet comprising one or more process steps.

The proposed method can be used for producing sulphuric acid from various stock materials, namely, sulphur, pyrite, effluent gases of metallurgical industry.

In addition to the quite obvious advantage of the proposed method, namely, the absence of sulphuric acid fog, and hence the obviation of the step at which sulphuric acid is recovered from exhausts, the proposed method is also characterized by a high efficiency for the processes involved. According to tentative estimations, the capital investments for the absorption equipment are about 5 times less than with the prior-art methods.

The proposed contact method of producing sulphuric acid is based on the following physical characteristics of the system, including aqueous solutions of sulphuric acid, and a gaseous mixture containing sulphuric anhydride which and is free of water vapours.

The vapour over solutions of sulphuric acid contains molecules of water, sulphuric acid and sulphuric anhydride. With the concentration of sulphuric acid being of 98.5 percent, the total equilibrium vapour pressure is minimum, and at ordinary temperatures of the process (60°–120° C) is practically zero.

As the concentration of sulphuric acid rises above 98.5 percent the equilibrium pressure of the sulphuric anhydride vapour sharply increases and the equilibrium pressure of the sulphuric acid vapour increases markedly. As the concentration of sulphuric acid drops below 98.5 percent, the equilibrium pressure of the water vapours increases and that of sulphuric acid vapour decreases.

The formation of the sulphuric acid fog in the process of absorption of sulphuric anhydride proceeds as follows: molecules of water evolve from the surface of the aqueous solution of sulphuric acid to join in the gaseous phase of the molecules of sulphuric anhydride and form a supersaturated vapour of sulphuric acid, which is condensed instantaneously in the gas stream to form the fog. Simultaneously, sulphuric anhydride is absorbed on the surface of sulphuric acid.

The quantity of the thusly formed sulphuric acid fog is proportional to the quantity of the liberated water vapour, which in turn decreases with an increase in the concentration of the aqueous solutions of sulphuric acid.

If conditions are present under which the surface of the aqueous solution of sulphuric acid is limited to a certain value, and is sufficiently stable, while the velocity at which the sulphuric anhydride molecules are transferred from the gaseous phase to this surface is sufficiently high, the surface of the aqueous solution of sulphuric acid having the average concentration below 98 percent is quickly saturated with sulphuric anhydride to a concentration of at least 98.5 percent, which suppresses the formation of the fog, because at this concentration the surface of the acid does not evolve water vapours into the gas phase.

These conditions can be provided with decreased quantities of sulphuric acid per unit volume of the gas, increased velocity of the gas flow and an increased concentration of sulphuric anhydride in the initial gaseous mixture.

The proposed method for preparing sulphuric acid can be realized as follows.

Sulphur is burnt in a furnace in a medium of dry air. The prepared gas, containing sulphurous acid anhydride is delivered into a contact apparatus where sulphurous acid anhydride is oxidized into sulphuric anhydride.

If pyrite is used as the starting material, the gas prepared for roasting is first purified, then dried and delivered into a contact apparatus in order to oxidize the sulphurous anhydride into sulphuric anhydride.

The gas discharged from the contact apparatus is cooled and delivered into an absorption unit consisting of three steps, each comprising a plurality of vertical tubes operating in parallel and provided with a cooling jacket.

The gaseous mixture containing sulphuric anhydride and which is free of water vapours is passed subsequently through the three steps in an upstream flow. At each step, the sulphuric acid feed is delivered into the lower part of the working tubes where it is entrapped into the gas stream, and as it moves through the tubes it absorbs sulphuric anhydride from the gaseous mixture. At the outlet from the working tubes of each step, sulphuric acid is separated from the gas stream and is removed from the absorption unit, while the gaseous mixture is delivered to the next step.

For a better understanding of the invention, the following examples of its practical embodiment are given below by way of illustration.

EXAMPLE 1

Pyrite is roasted in a furnace in dry air medium. The obtained gas is purified and, cooled and then dried to a residual moisture content of 0.01 percent by volume. After drying, the gaseous mixture is delivered into a contact apparatus, where sulphurous acid anhydride is oxidized into sulphuric anhydride. The gaseous mixture discharged from the contact apparatus is then cooled.

The cooled gaseous mixture having an initial concentration of sulphuric anhydride of 6.88 percent by volume and temperature of 112° C is passed under a pressure close to atmospheric through a working tube having an inner diameter of 21 mm and a length of 1.5 m in the direction from the bottom to the top, with a flow velocity of 14.9 normal meters per second. Sulphuric acid having a concentration of 96.2 percent in terms of $H_2SO_4$ is delivered into the lower part of the working tube at a temperature of 43° C in a quantity of 1.47 kg per kg of the gaseous mixture.

The acid is entrapped in the gas flow and is brought by the gas upwards through the tube, partly in the form of film, along the inner surface of the working tube, and partly in the form of sprays in the centre of the gaseous flow. The sulphuric anhydride is absorbed in the acid, and as a result its concentration increases at the first step to 98.8 percent in terms of $H_2SO_4$.

The saturated sulphuric acid is separated from the gaseous flow in a separator at the outlet of the working tube of the first step.

The cooling water is delivered into the jacket at a temperature of 25° C.

The main bulk of sulphuric anhydride is absorbed from the gaseous mixture by the acid in the first step. The gaseous mixture is cooled to a temperature of 73° C.

The gaseous mixture is then passed through the second step of the absorption unit, which is identical in its design to the first step.

Sulphuric acid having a concentration of 95.9 percent is delivered at a temperature of 38° C into the lower part of the working tube of the second step in a quantity of 0.97 kg per kg of the gaseous mixture. At the second step of the absorption unit, sulphuric acid is saturated with sulphuric anhydride to a concentration of 97.4 percent, while the gaseous mixture loses another part of its sulphuric anhydride content and is the cooled to a temperature of 47° C.

The gaseous mixture having a concentration of sulphuric anhydride of 0.32 percent by volume is passed at a flow velocity of 13.9 normal meters per second through the working tube of the third step of the absorption unit, which is identical in its design to the former two units. The concentration of the sulphuric acid delivered into the lower part of the working tube of the third step is 96.9 percent. The temperature of the acid is 30° C. The rate of delivery is 0.45 kg per kg of the gaseous mixture. At the outlet of the third step of the absorption unit, the concentration of the sulphuric acid is 97.2 percent and the temperature is 34° C.

The gaseous mixture discharged from the third step contains as little as 0.323 g/cu.m. of sulphuric anhydride and 0.032 g/cu.m. of sulphuric acid in the form of fog. The total degree of absorption of sulphuric anhydride at the three steps of the absorption process (taking into account the loss in the form of non-absorbed sulphuric anhydride and sulphuric acid fog) is 99.86 percent.

The concentration of the sulphuric acid issuing from each of the three steps of the absorption unit is higher than the concentration of the acid fed into each of these steps. The acid discharged from the absorption unit is mixed in a special apparatus wherefrom part of the acid is dispatched as the finished product, while part of it is delivered to feed the absorption unit.

EXAMPLES 2, 3 and 4

Sulphur is burnt in a furnace in a an medium an air-dried as a preliminary step to render the residual moisture content to 0.02 percent by volume. The prepared gas containing sulphurous acid anhydride is delivered into a contact apparatus where sulphurous anhydride is oxidized into sulphuric anhydride. The gaseous mixture discharged from the contact apparatus is cooled and delivered into an absorption unit which is similar to that described in Example 1 previously.

The parameters characterizing the work of the absorption unit are summarized in the Table which follows hereinafter.

Table

| Example No. | 2 | | | 3 | | | 4 | | |
|---|---|---|---|---|---|---|---|---|---|
| Step No. | I | II | III | I | II | III | I | II | III |
| Acid | | | | | | | | | |
| Quantity per kg of gaseous mixture, kg | 1.33 | 0.52 | 0.45 | 0.87 | 0.78 | 0.93 | 0.83 | 1.02 | 0.74 |
| Concentration of $H_2SO_4$: | | | | | | | | | |
| inlet | 92.9 | 93.2 | 96.9 | 96.4 | 96.6 | 96.3 | 96.8 | 96.8 | 96.8 |
| outlet | 96.0 | 95.3 | — | 99.4 | 98.2 | 96.7 | 100.3 | 98.9 | 97.0 |
| Temperature, °C | | | | | | | | | |
| inlet | 30 | 27 | 29 | 36 | 35 | 42 | 52 | 48 | 43 |
| outlet | — | — | 34 | — | — | 39 | — | — | 46 |
| Gaseous mixture | | | | | | | | | |
| Flow velocity, normal meters/sec | 15.2 | — | 14.2 | 14.4 | — | 13.4 | 15.1 | — | 14.0 |
| Concentration on $SO_3$,% (v/v), inlet | 6.75 | — | — | 7.13 | — | 0.51 | 6.81 | — | 0.29 |
| Temperature, °C | | | | | | | | | |
| inlet | 98 | 78 | 50 | 107 | 66 | 50 | 122 | 72 | 55 |
| outlet | — | — | 40 | — | — | 42 | — | — | 46 |
| Concentration of $SO_3$ at outlet, g/cu.m.; | — | — | 0.438 | — | — | 0.221 | — | — | 0.132 |
| $H_2SO_4$ fog content at outlet, g/cu.m.; | — | — | 0.130 | — | — | 0.011 | — | — | 0.030 |
| Total absorption of sulphuric anhydride, in % | — | — | 99.82 | — | — | 99.91 | — | — | 99.94 |

What is claimed is:

1. In a contact method of producing sulphuric acid comprising the steps of roasting a stock material selected from the group consisting of sulphur and pyrite to form a gaseous mixture containing sulphurous acid anhydride and having a moisture content not higher than 0.02 percent by volume, oxidizing the sulphurous acid anhydride in said gaseous mixture into sulphuric anhydride, and successively contacting said gaseous mixture at a temperature of from 30°–125° C with at least one separate batch of a 92-98 percent sulphuric acid solution in relative quantities, sufficient to absorb from said gaseous mixture a substantial portion of the sulphuric anhydride remaining therein while increasing the sulphuric acid concentration of each batch of solution so contacted; the improvement whereby the sulphuric acid fog content in the gaseous mixture exhaust is maintained at a maximum of 0.15 g/cu.m, comprising the steps of limiting the quantity of each separate batch of sulphuric acid solution so contacted to from about 0.45 to about 1.47 kg per kg of said gaseous mixture being contacted while maintaining the flow velocity of said gaseous mixture at from about 13.4 to about 15.2 normal meters per second.

2. A method according to claim 1, in which the gaseous mixture being contacted with any succeeding batch of sulphuric acid solution contains from about 0.29 to about 7.13 percent of sulphuric anhydride.

* * * * *